No. 672,169. Patented Apr. 16, 1901.
O. JANELLE.
FILLING CHANGING MECHANISM FOR LOOMS.
(Application filed Oct. 23, 1900.)

(No Model.)

Witnesses,
Edward F. Allen.
Adolf C. Kaiser.

Inventor,
Oscar Janelle,
by Crosby Gregory
Atty's.

THE NORRIS PETERS CO., PHOTO-LITHO., WASHINGTON, D. C.

United States Patent Office.

OSCAR JANELLE, OF MANCHESTER, NEW HAMPSHIRE, ASSIGNOR TO DRAPER COMPANY, OF PORTLAND, MAINE, AND HOPEDALE, MASSACHUSETTS.

FILLING-CHANGING MECHANISM FOR LOOMS.

SPECIFICATION forming part of Letters Patent No. 672,169, dated April 16, 1901.

Application filed October 23, 1900. Serial No. 34,085. (No model.)

*To all whom it may concern:*

Be it known that I, OSCAR JANELLE, a citizen of the United States, and a resident of Manchester, county of Hillsboro, State of New Hampshire, have invented an Improvement in Filling-Changing Mechanism for Looms, of which the following description, in connection with the accompanying drawings, is a specification, like characters on the drawings representing like parts.

This invention relates particularly to mechanism for automatically changing the filling in looms, the filling-carriers being held in a feeder which is intermittingly moved to bring the filling-carriers singly into position to be removed from the feeder by a transferrer, a filling-changing mechanism of this general type forming the subject-matter of United States Letters Patent No. 651,715, dated June 12, 1900.

In my present invention I have provided a very simple feeder, the movement of a weight from normal to abnormal position after operation of the transferrer effecting forward or feeding movement of the feeder, means being provided for thereafter returning the actuating device to normal position.

Figure 1:
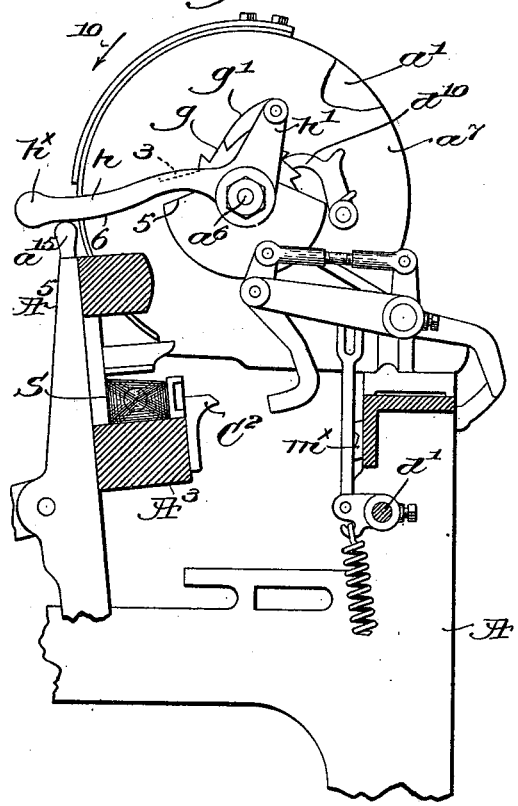
Figure 2:
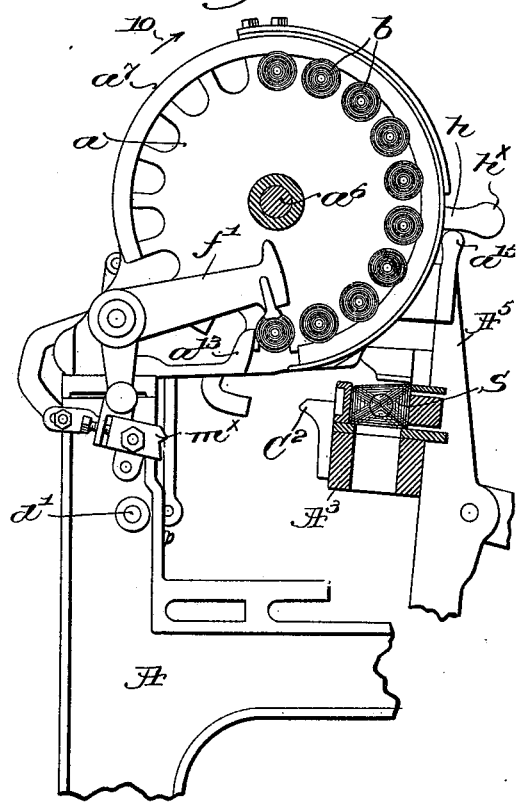

Figure 1 is a transverse sectional view of a portion of a loom, taken at the inner end of the filling-changing mechanism and illustrating one embodiment of my invention; and Fig. 2 is a similar view, but taken through the feeder, between its ends.

The loom-frame A, lay $A^3$, self-threading shuttle S, the feeder, consisting, essentially, of a notched disk $a$ to receive the heads of the filling-carriers $b$ and a second disk $a'$ to hold their tips, the disks being connected to rotate in unison on the fixed stud $a^6$, secured to a stand $a^7$, and the transferrer $f'$ may be and are substantially as in the patent referred to, the dog $m^\times$ being governed as to its position relative to the bunter $C^2$ by or through the rock-shaft $d'$ and the intervening connections in well-known manner. A ratchet $g$, Fig. 1, is mounted to rotate with the feeder, and a pawl $g'$ coöperates with the ratchet, said pawl being mounted on the upturned end $h'$ of an arm $h$, fulcrumed coaxially with the feeder and herein shown as mounted on the stud $a^6$.

The arm $h$ projects rearwardly and is enlarged or weighted, as at $h^\times$, being heavy enough to turn the feeder in the direction of arrow 10 when the feeder is free to move.

A fixed stop $a^{13}$, Fig. 1, is arranged in the path of the series of filling-carriers $b$ to engage the endmost one and stop forward movement of the feeder, such filling-carrier being in position to be transferred. When transfer is effected, the feeder is released, and as the transferrer $f'$ returns to normal position the actuator or arm $h$ swings down into abnormal position and, through the pawl and ratchet, turns the feeder until the next filling-feeder of the series engages the stop $a^{13}$, the descent of the arm $h$ being limited by engagement of an ear 3 thereon with a stop 5 on the stand $a^7$. (See Fig. 1.)

The lay-sword $A^5$ has a projection $a^{15}$ thereon which engages the convex under side 6 of the arm $h$ when the latter is lowered, and as the lay moves back the projection $a^{15}$ lifts the arm into normal position, the pawl taking a fresh hold on the ratchet ready to again actuate the feeder.

A detent-pawl $d^{10}$ prevents retrograde movement of the feeder.

By the construction herein shown and described I obviate the use of a heavy actuating-spring for the feeder and yet obtain a positive movement for feeding the filling-carriers, the easy movement afforded by the weight preventing improper shock or strain upon the filling-carriers as they are brought against the stop.

The construction is exceedingly simple and durable, positive in its action, and very effective.

Having fully described my invention, what I claim as new, and desire to secure by Letters Patent, is—

1. A feeder to hold a series of filling-carriers, a pivotally-mounted weight operatively connected with and to intermittingly actuate the feeder to bring the filling-carriers singly into operative position, a transferrer, removal of a filling-carrier thereby permitting movement of the weight to actuate the feeder, and means to return the weight to normal position after it has actuated the feeder.

2. A rotatable feeder to hold a circularly-arranged series of filling-carriers, an attached ratchet, a stop to engage the endmost filling-carrier, and hold the feeder from rotation, a transferrer, a weighted actuator fulcrumed coaxially with the feeder, a pawl on said arm, coöperating with the ratchet, to move the feeder positively after operation of the transferrer, and place the next succeeding filling-carrier of the series in the path of the transferrer, and means to return the weighted actuator to normal position.

In testimony whereof I have signed my name to this specification in the presence of two subscribing witnesses.

OSCAR JANELLE.

Witnesses:
C. S. MAYBON,
A. W. MORGAN.